(12) United States Patent
Yoshioka

(10) Patent No.: US 7,161,878 B2
(45) Date of Patent: *Jan. 9, 2007

(54) RECORDING APPARATUS FOR AN OPTICAL DISK

(75) Inventor: Shingo Yoshioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,377

(22) Filed: Oct. 28, 2005

(65) Prior Publication Data

US 2006/0062111 A1 Mar. 23, 2006

Related U.S. Application Data

(63) Continuation of application No. 10/332,741, filed as application No. PCT/JP02/04562 on May 10, 2002, now Pat. No. 7,057,984.

(30) Foreign Application Priority Data

May 11, 2001 (JP) .............................. 2001-141042

(51) Int. Cl.
G11B 7/00 (2006.01)
G11B 19/02 (2006.01)

(52) U.S. Cl. ................................. 369/47.11; 369/47.31; 369/53.37

(58) Field of Classification Search ............... None
See application file for complete search history.

(56) References Cited

U.S. PATENT DOCUMENTS

| 5,177,720 A | * | 1/1993 | Kondo ..................... 369/30.04 |
| 5,323,367 A | * | 6/1994 | Tamura et al. ........... 369/30.36 |
| 5,341,357 A |   | 8/1994 | Mukawa et al. |
| 5,359,583 A | * | 10/1994 | Jung ........................ 369/53.37 |
| 5,453,967 A | * | 9/1995 | Aramaki et al. ......... 369/47.11 |
| 5,633,840 A | * | 5/1997 | Han ........................ 369/30.04 |
| 5,815,472 A |   | 9/1998 | Kuroda et al. |
| 6,198,707 B1 |   | 3/2001 | Yamamoto |
| 6,778,481 B1 | * | 8/2004 | Seo .......................... 369/53.18 |

FOREIGN PATENT DOCUMENTS

EP 0 974 966 1/2000

(Continued)

OTHER PUBLICATIONS

Ryoichi Oba, Junji Shiokawa, Hiroshi Chiba, Akihito Nishizawa, and Hirotaka Kobayashi, "Video Camera Recorder Using Small-Size DVD-RAM", Aug. 2000, IEEE Transactions on Consumer Electronics, vol. 46, No. 3, pp. 572-577.

Primary Examiner—William Korzuch
Assistant Examiner—Christopher Lamb
(74) Attorney, Agent, or Firm—Frommer Lawrence & Haug LLP; William S. Frommer; Paul A. Levy

(57) ABSTRACT

The present invention relates to a recording apparatus for improving operability of a DVD camcorder that performs recording in a video format. When an instruction for starting recording is given at a time T11 and then an instruction for stopping the recording is given at a time T12, a DVD camcorder is brought into a pause state at the time T12. An address and the like of an optical disk at that time are stored in a recording RAM. When an instruction for resuming recording is given at a time T13, the address stored in the recording RAM is read, and rerecording is started at a position on the optical disk which position corresponds to the address. The present invention is applicable to DVD camcorders.

6 Claims, 6 Drawing Sheets

FOREIGN PATENT DOCUMENTS

| | | |
|---|---|---|
| EP | 1 024 492 | 8/2000 |
| EP | 1 024 494 | 8/2000 |
| JP | 5-114276 | 5/1993 |
| JP | 7-37341 | 2/1995 |
| JP | 8-55415 | 2/1996 |
| JP | 9-63192 | 3/1997 |
| JP | 2000-215647 | 8/2000 |
| JP | 2000-222822 | 8/2000 |

* cited by examiner

RECORDING APPARATUS FOR AN OPTICAL DISK

This is a continuation of application Ser. No. 10/332,741, filed Jan. 10, 2003 now U.S. Pat. No. 7,057,984, which is a continuation of PCT application PCT/JP02/04562, filed May 10, 2002, claiming priority to Japanese patent application 2001-141042, filed May 11, 2001, the entirety of which is incorporated herein by reference.

TECHNICAL FIELD

The present invention relates to a recording apparatus, and particularly to a recording apparatus for improving operability of a DVD camcorder that performs recording in a video format.

BACKGROUND ART

Recording formats of DVD (Digital Versatile Disc) camcorders recently developed or commercialized by various companies include a video recording format in which importance is attached to recording editing and given data is written in a random order, and a video format in which importance is attached to conventional compatibility and data is written linearly (so as to be added from a position where writing is ended).

In this video format, a video area for writing video data constitutes one VMG (Video Manager) and a maximum of 99 VTSs (Video Title Sets) (hereinafter referred to as titles where appropriate). Each VTS includes VTSI (Video Title Set Information), which is control information of the VTS. The VTSI is rewritten each time recording for one title is completed.

MPEG data or the like obtained by picture taking is stored in VTS_VOBS. The VTS_VOBS constitutes a maximum of 255 cells.

A cell is a unit for recording video data. In a case of a disk capable of recording video data for two hours, a recording time of a single cell is a little less than 28 seconds.

FIG. 1 is a diagram showing an example of a time chart of a conventional DVD camcorder.

When a user gives an instruction for starting recording at a time T1 and then gives an instruction for stopping the recording at a time T2, the recording is continued until a time T4, in which timing recording for one title is completed. Then, in a period from the time T4 to a time T5, VTSI is rewritten. The DVD camcorder is in a standby state (stop state) during a period from the time T2 to the time T5.

Hence, as shown in FIG. 1, even when the user gives an instruction for rerecording at a time T3, since the recording processing for one title and VTSI rewriting processing are performed, the rerecording is started at the time T5, at which the rewriting of the VTSI is completed. That is, recording cannot be resumed immediately after the recording is stopped.

In a case where recording is stopped 15 seconds after the start of the recording, for example, since the shortest recording time of one title corresponds to the recording time of one cell, or is a little less than 28 seconds, the user cannot resume recording until the remaining 13 seconds passes, and this represents poor operability.

In addition, in a period from the time T2 to the time T4 in FIG. 1, data not desired by the user is recorded. This means that capacity of the DVD disk is wasted.

DISCLOSURE OF INVENTION

The present invention has been made in view of the above, and it is accordingly an object of the present invention to improve operability and prevent disk capacity from being wasted.

According to the present invention, there is provided a recording apparatus characterized by including: recording means for recording data from a position continuously succeeding a recorded area on an optical disk; first setting means for setting a pause state in response to an instruction for stopping the recording by the recording means; storing means for storing stop position information of the optical disk when the pause state is set by the first setting means; and reading means for reading the stop position information stored by the storing means when an instruction for starting recording by the recording means is given in the pause state; wherein the recording means starts recording at a position on the optical disk which position corresponds to the stop position information read by the reading means.

The recording apparatus can further include: reproducing means for reproducing the data recorded by the recording means; determining means for determining whether reproduction made thus far has been started after cancellation of a pause state when an instruction for stopping the reproduction by the reproducing means is given; and second setting means for setting a pause state when the determining means determines that the reproduction has been started after the cancellation of the pause state.

The storing means can further store the data already obtained in a case where a predetermined unit of the data to which to add an error correction block is not obtained when the instruction for stopping the recording by the recording means is given, and the recording means can start recording on the basis of the data already obtained and stored by the storing means when an instruction for resuming the recording is given.

The recording apparatus can further include prohibiting means for prohibiting ejection of the optical disk while the recording means records data.

According to the present invention, there is provided a recording method of a recording apparatus, the recording method characterized by including: a recording step for recording data from a position continuously succeeding a recorded area on an optical disk; a setting step for setting a pause state in response to an instruction for stopping the recording by the processing of the recording step; a storing step for storing stop position information of the optical disk when the pause state is set by the processing of the setting step; and a reading step for reading the stop position information stored by the processing of the storing step when an instruction for starting recording by the processing of the recording step is given in the pause state; wherein the processing of the recording step starts recording at a position on the optical disk which position corresponds to the stop position information read by the processing of the reading step.

According to the present invention, there is provided a program executed by a computer, the program characterized by including: a recording control step for controlling recording of data from a position continuously succeeding a recorded area on an optical disk; a setting control step for controlling setting of a pause state in response to an instruction for stopping the recording by the processing of the recording control step; a storing control step for controlling storing of stop position information of the optical disk when the pause state is set by the processing of the setting control step; and a reading control step for controlling reading of the stop position information stored by the processing of the storing control step when an instruction for starting recording by the processing of the recording control step is given in the pause state; wherein the processing of the recording control step starts recording at a position on the optical disk which position corresponds to the stop position information read by the processing of the reading control step.

With the recording apparatus and method and the program according to the present invention, data is recorded from a position continuously succeeding a recorded area on an optical disk, and a pause state is set in response to an instruction for stopping the recording. When the pause state is set, stop position information of the optical disk is stored, and when an instruction for starting recording is given in the pause state, the stored stop position information is read. Then, recording is started at a position on the optical disk which position corresponds to the read stop position information.

BEST MODE FOR CARRYING OUT THE INVENTION

Figure 2:
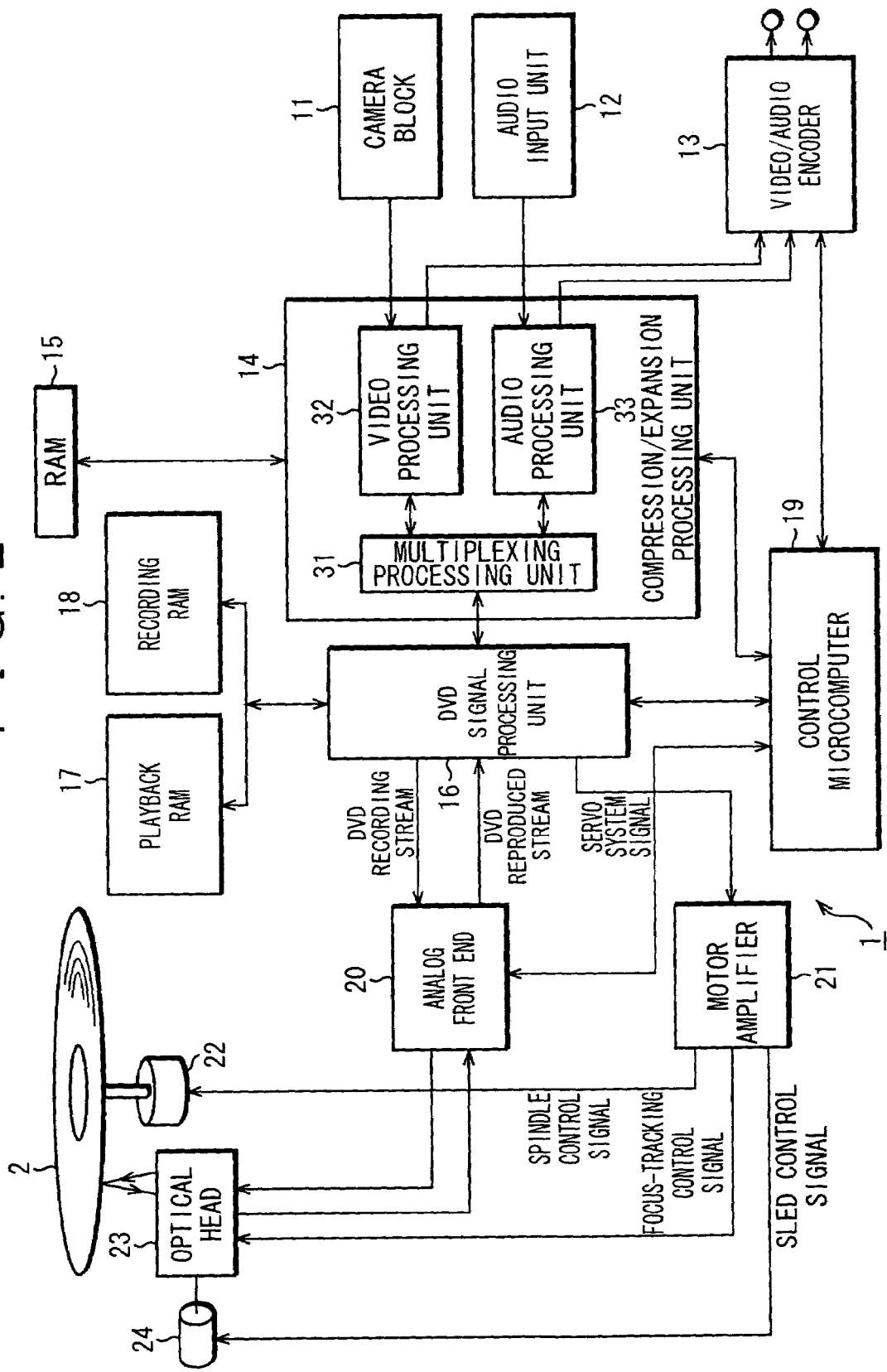
FIG. 2 is a block diagram showing an example of configuration of a DVD camcorder to which the present invention is applied.

FIG. 2 is a block diagram showing an example of configuration of a DVD camcorder 1 to which the present invention is applied.

A camera block 11 includes a lens for image pickup, a motor for driving the lens, a CCD (Charge Coupled Device) for converting light of a subject inputted from the lens into an electric signal, and the like. The camera block 11 then converts the image signal obtained into digital data and outputs the digital data to a video processing unit 32 of a compression/expansion processing unit 14.

An audio input unit 12 converts an audio signal that is obtained by collecting sound by a microphone connected to the audio input unit 12 and is supplied to the audio input unit 12 into digital data, and then outputs the digital data to an audio processing unit 33 of the compression/expansion processing unit 14.

The video processing unit 32 subjects the video data supplied from the camera block 11 to DCT (Discrete Cosine Transform) processing, quantization processing, and the like on the basis of an MPEG (Moving Picture Experts Group) 2 format, for example, and then outputs the compressed video data to a multiplexing processing unit 31. Also, the video processing unit 32 expands video data supplied thereto from the multiplexing processing unit 31 on the basis of the MPEG2 format, for example, and then outputs resulting video data to a video/audio encoder 13.

The audio processing unit 33 compresses audio data supplied thereto from the audio input unit 12 on the basis of an MPEG audio, Dolby digital, linear PCM, or other format, and then outputs resulting audio data to the multiplexing processing unit 31. Also, the audio processing unit 33 expands audio data supplied thereto from the multiplexing processing unit 31, and then outputs resulting audio data to the video/audio encoder 13.

The multiplexing processing unit 31 multiplexes the video data supplied thereto from the video processing unit 32 and the audio data supplied thereto from the audio processing unit 33, and then outputs resulting mixed data to a DVD signal processing unit 16. The multiplexing processing unit 31 outputs the mixed data in units of 2048 bytes corresponding to a recording capacity of one sector of a DVD disk 2 according to a recording format of the DVD disk 2, for example.

Also, the multiplexing processing unit 31 separates data supplied thereto from the DVD signal processing unit 16 into video data and audio data, and then outputs the video data to the video processing unit 32 and the audio data to the audio processing unit 33.

When supplied by a control microcomputer 19 (hereinafter referred to as a control micon 19) user with an instruction for recording, the DVD signal processing unit 16 adds a predetermined error correction block to the data supplied thereto from the multiplexing processing unit 31 of the compression/expansion processing unit 14, subjects the data with the error correction block added thereto to 8/16 modulation, scrambling and the like, and then outputs the result to an analog front end 20. For example, the DVD signal processing unit 16 adds one error correction block to a group of 16 sectors of the data supplied from the compression/expansion processing unit 14.

When thereafter supplied with an instruction for stopping the recording, the DVD signal processing unit 16 stores a track number, a sector number (referred to collectively as positional information where appropriate when the track number and the sector number do not need to be differentiated from each other), and the like of the DVD disk 2 at that moment in a recording RAM 18. When supplied with an instruction for resuming recording, recording is resumed at a position on the DVD disk 2 which position corresponds to the stored positional information.

When given an instruction for stopping the recording before being supplied with 16 sectors of data to which to add an error correction block, the DVD signal processing unit 16 also stores data already supplied thereto and the like in the recording RAM 18.

For example, when given an instruction for stopping the recording on being supplied with eight sectors of data from the compression/expansion processing unit 14, the DVD signal processing unit 16 stores the eight sectors of data in the recording RAM 18. When thereafter recording is resumed and 16 sectors of data including the data stored in the recording RAM 18 have been supplied, the DVD signal processing unit 16 adds an error correction block, performs predetermined other processing, and then outputs resulting data to the analog front end 20.

When given an instruction for stopping the recording, the DVD camcorder 1 remains in a pause state until an instruction for turning power off, ejecting the disk, or the like is given. Processing of the DVD camcorder 1 when given an instruction for stopping the recording will be described later in detail.

When the DVD signal processing unit 16 reproduces a DVD reproduced stream supplied thereto from the analog front end 20, the DVD signal processing unit 16 subjects the DVD reproduced stream to 8/16 demodulation, predetermined error correction, descrambling, and the like in a playback RAM 17, and then outputs resulting data to the compression/expansion processing unit 14.

Also, the DVD signal processing unit 16 generates a servo system signal for controlling a spindle motor 22, an optical head 23, and a sled motor 24 on the basis of a tracking error signal supplied thereto from the analog front end 20, and then outputs the servo system signal to a motor amplifier 21.

The control micon 19 controls operation of the whole of the DVD camcorder 1 including the analog front end 20, the DVD signal processing unit 16, the compression/expansion processing unit 14, and the video/audio encoder 13 on the basis of a signal corresponding to an instruction from the user which signal is supplied from an input unit not shown in the figure.

The analog front end 20 converts a DVD recording stream supplied thereto from the DVD signal processing unit 16 to an analog form under control of the control micon 19, subjects the resulting DVD recording stream to amplification processing and the like, and then outputs the result to the optical head 23. Also, the analog front end 20 controls light emission of a laser in the optical head 23.

Further, when data recorded on the DVD disk 2 is read, the analog front end 20 amplifies a signal corresponding to reflected laser light which signal is supplied from the optical head 23, converts the signal to digital form, and then outputs the resulting signal as a DVD reproduced stream to the DVD signal processing unit 16. Further, the analog front end 20 generates a tracking error signal from the signal corresponding to intensity of the reflected light, which is supplied from the optical head 23, converts the tracking error signal to digital form, and then outputs the result to the DVD signal processing unit 16.

The motor amplifier 21 generates a spindle control signal, a focus-tracking control signal, and a sled control signal on the basis of the servo system signal supplied thereto from the DVD signal processing unit 16, and then outputs the spindle control signal, the focus-tracking control signal, and the sled control signal to the spindle motor 22, the optical head 23, and the sled motor 24, respectively, to control these parts.

The spindle motor 22 rotates the DVD disk 2 inserted in the DVD camcorder 1 at predetermined rotational speed on the basis of the spindle control signal supplied thereto from the motor amplifier 21.

The optical head 23 irradiates a predetermined position on the DVD disk 2 with a laser from an irradiating unit (not shown) on the basis of the focus-tracking control signal supplied thereto from the motor amplifier 21 and under control of the analog front end 20.

Further, the optical head 23 receives the laser applied from the irradiating unit to a surface of the DVD disk 2 and reflected from the surface of the DVD disk 2, thereby reading pits on the DVD disk 2, and then outputs the signal corresponding to the intensity of the reflected light to the analog front end 20.

The sled motor 24 moves the optical head 23 to a predetermined position on a line connecting a center of the DVD disk 2 to a circumference thereof so that the optical head 23 can irradiate a predetermined pit track on the DVD disk 2 with a laser and thereby read data recorded on the DVD disk 2.

Figure 3:
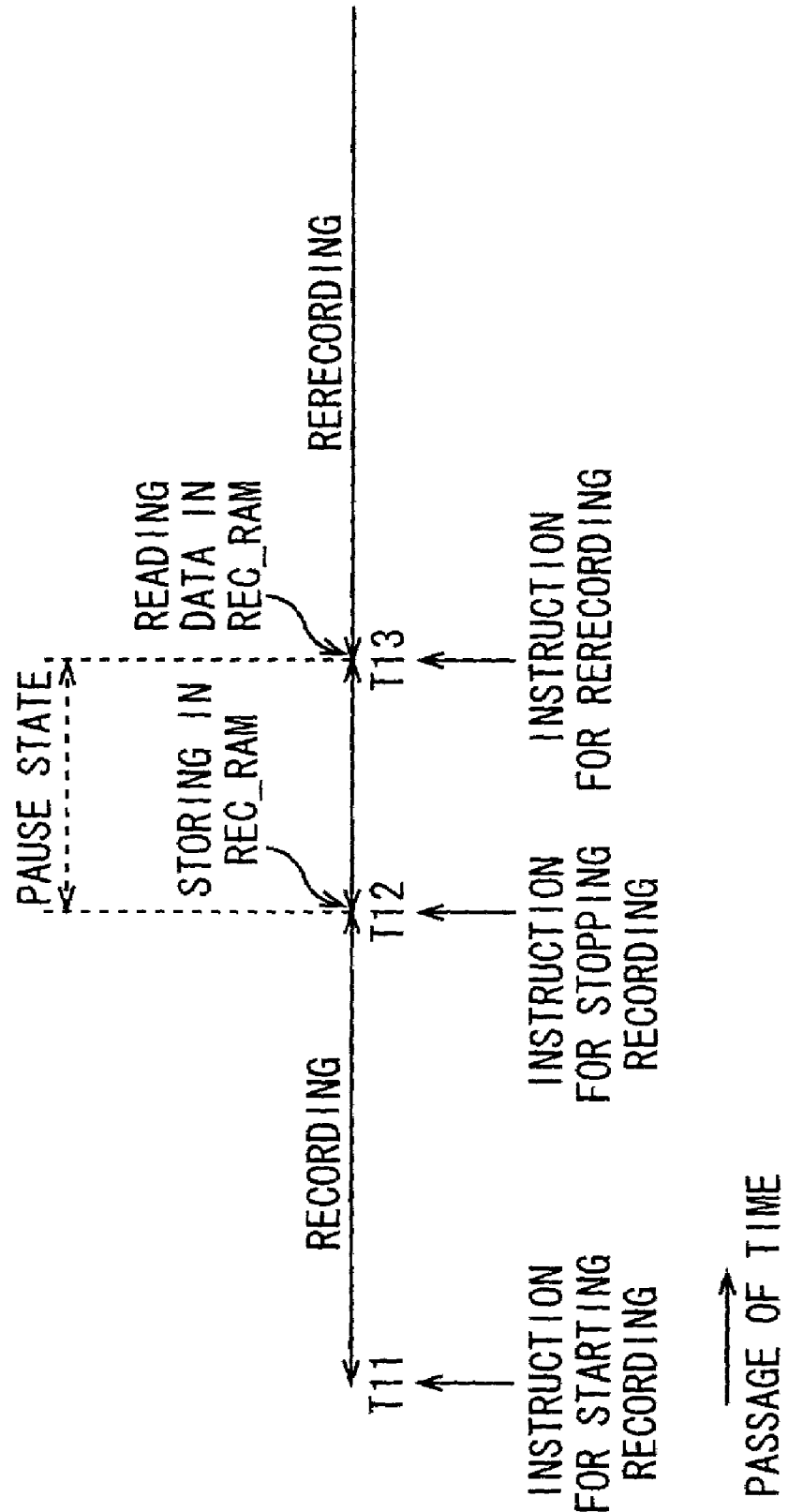
FIG. 3 is a diagram showing an example of a time chart of the DVD camcorder of FIG. 2.

FIG. 3 is a diagram showing an example of a time chart of the DVD camcorder 1 of FIG. 2.

When the input unit not shown in the figure gives an instruction for starting recording at a time T11 and then gives an instruction for stopping the recording at a time T12, in response to the instruction for stopping the recording, positional information of the DVD disk 2 and data less than 16 sectors of data to which to add an error correction block are stored in the recording RAM 18, as described above.

Figure 1:
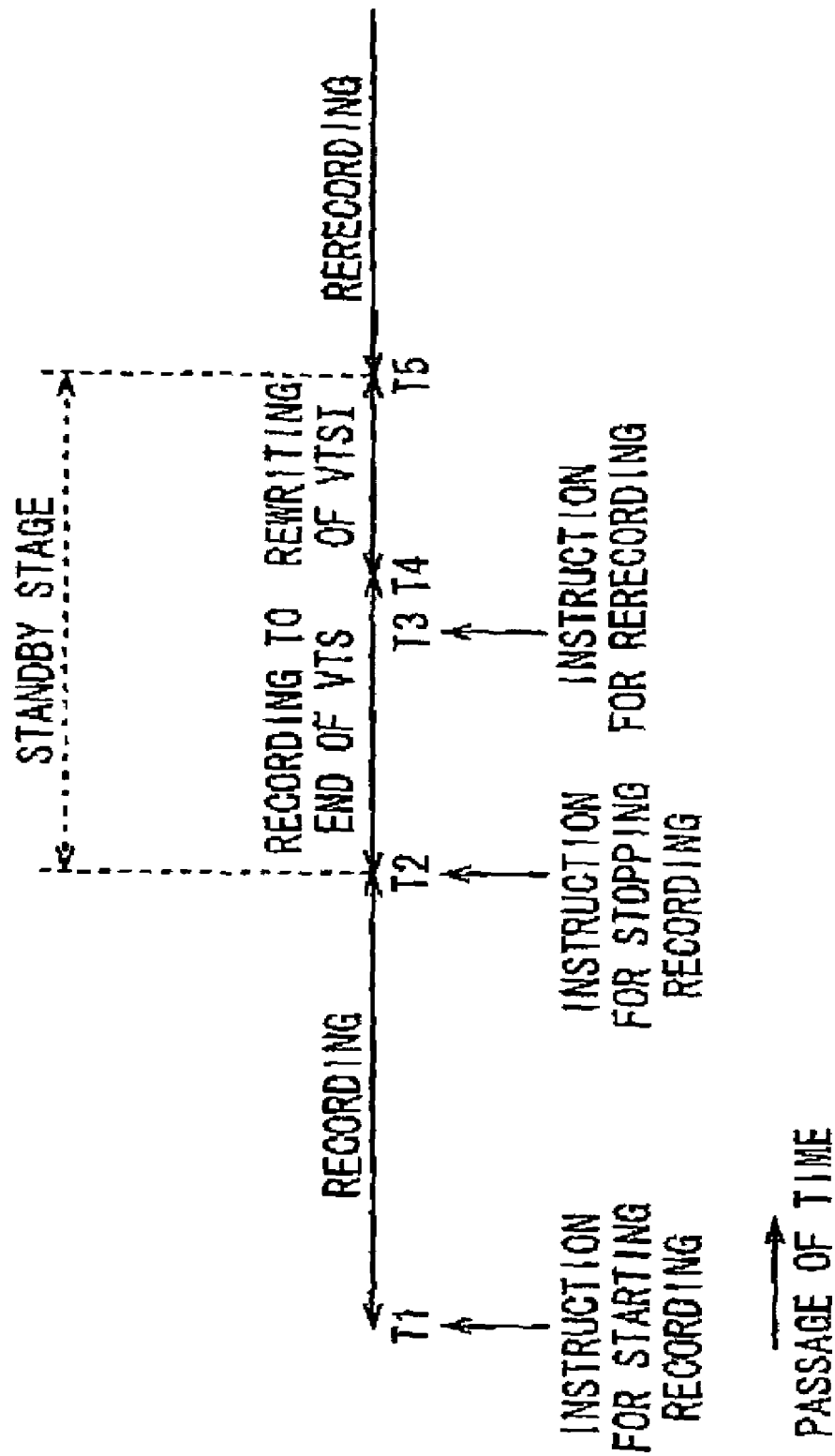
FIG. 1 is a diagram showing a time chart of a conventional DVD camcorder.

Also, the DVD camcorder 1 is brought into a pause state. Hence, when the DVD camcorder 1 is brought into a standby state, recording is continued until recording for one title is completed, and then VTSI is rewritten, as shown in FIG. 1; however, since the DVD camcorder 1 is in a pause state, the state is saved even in a middle of a title. Of course, the processing of rewriting VTSI at the time of completion of recording for one title is not performed.

When an instruction for rerecording is thereafter given at a time T13, the positional information and the like stored in the recording RAM 18 are read to resume recording at the corresponding position on the DVD disk 2.

As shown in FIG. 3, since the DVD camcorder 1 is brought into the pause state when an instruction for stopping recording is given, recording can be resumed immediately thereafter.

Figure 4:
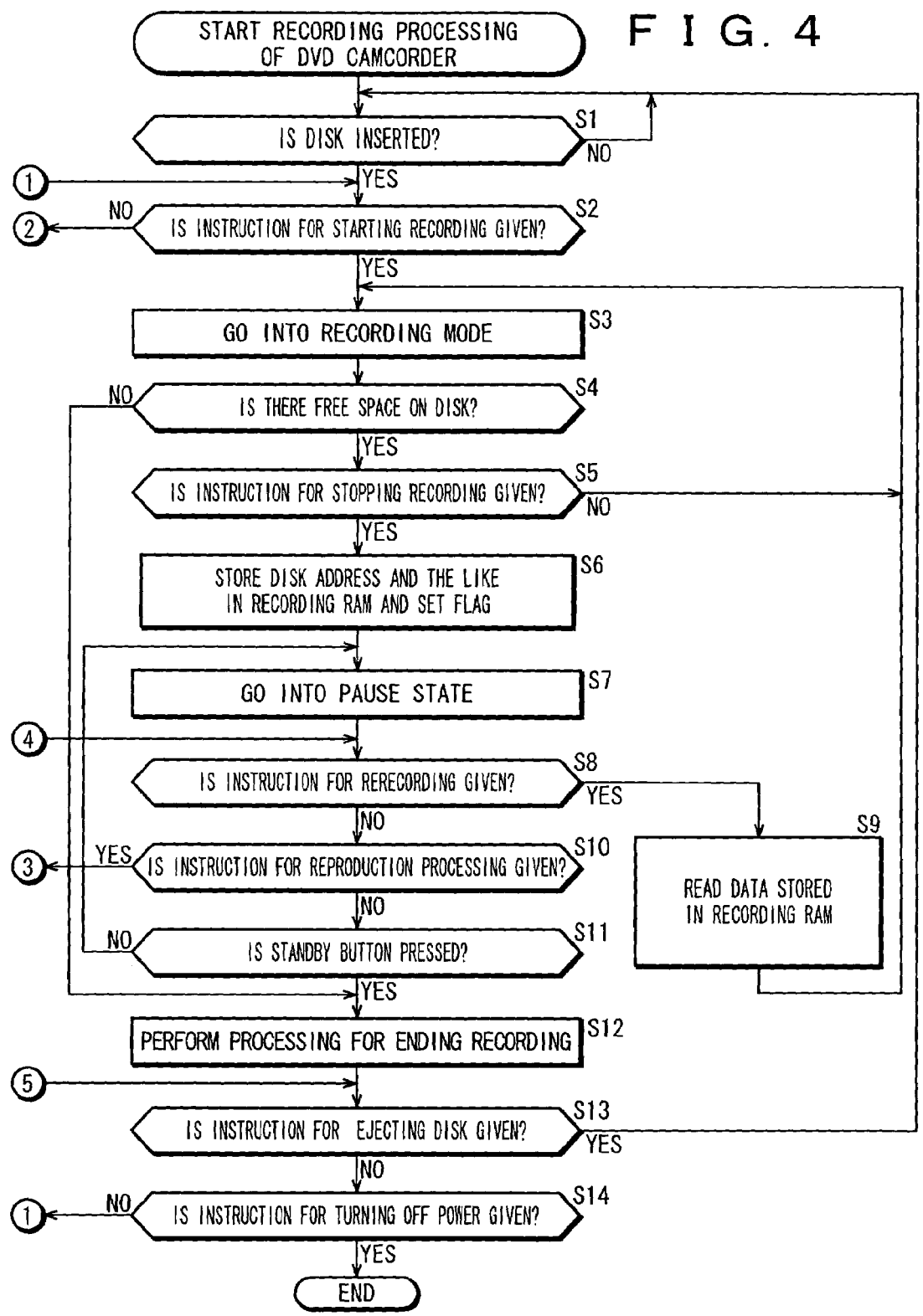
FIG. 4 is a flowchart of assistance in explaining processing of the DVD camcorder of FIG. 2.
Figure 5:
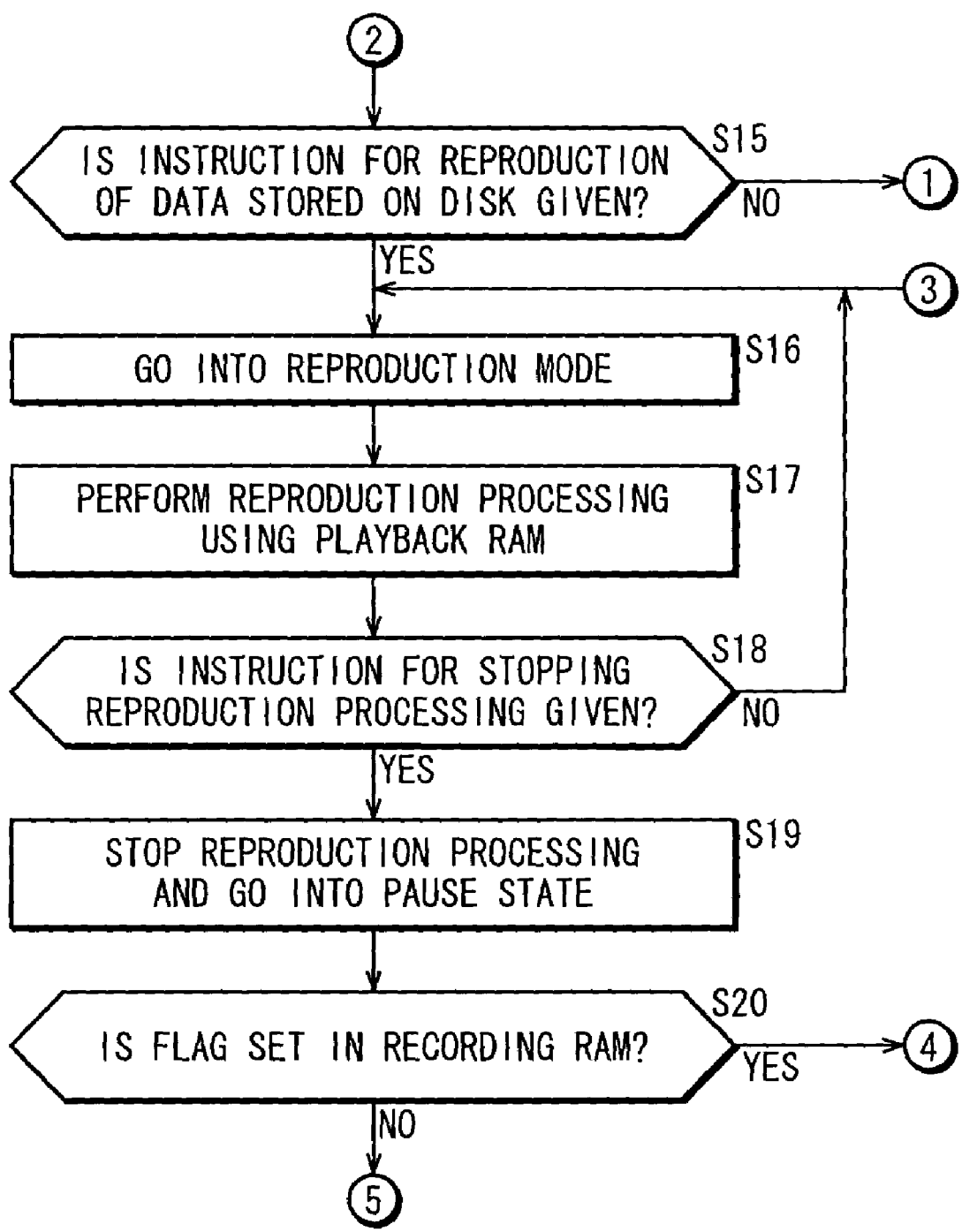
FIG. 5 is a flowchart continued from FIG. 4 of assistance in explaining the processing of the DVD camcorder of FIG. 2.

Recording processing of the DVD camcorder 1 of FIG. 2 will next be described with reference to flowcharts of FIG. 4 and FIG. 5.

At a step S1, the control micon 19 determines whether a DVD disk 2 is inserted or not. Until the control micon 19 determines that a DVD disk 2 is inserted, the control micon 19 displays a message such for example as "NO DISK" or the like on a display unit not shown in the figure and stands by. When the control micon 19 determines that a DVD disk 2 is inserted, the control micon 19 proceeds to a step S2.

The control micon 19 determines at the step S2 whether an instruction for starting recording is given from a user on the basis of a signal from the input unit not shown in the figure. When the control micon 19 determines that an instruction for starting recording is given, the control micon 19 proceeds to a step S3 to go into recording mode.

In the recording mode, video data supplied from the camera block 11 and audio data supplied from the audio input unit 12 are compressed in predetermined formats by the video processing unit 32 and the audio processing unit 33, respectively, and then multiplexed by the multiplexing processing unit 31. Resulting mixed data is then outputted to the DVD signal processing unit 16 in units of about 2 kbytes (one sector), as described above. When the DVD signal processing unit 16 is supplied with 16 sectors of data, the DVD signal processing unit 16 adds an error correction block to the data, subjects resulting data to processing such as 8/16 modulation processing, scrambling and the like, and then outputs the result as a DVD recording stream to the analog front end 20. The analog front end 20 converts the stream supplied thereto to analog form, and then records the result on the DVD disk 2 by controlling the optical head 23.

At a step S4, the control micon 19 determines whether there is free space on the DVD disk 2. When the control micon 19 determines that there is no free space on the DVD disk 2, the control micon 19 proceeds to a step S11 to perform processing for ending recording to be described later. When the control micon 19 determines at the step S4 that there is free space on the DVD disk 2, the control micon 19 continues recording and proceeds to a step S5.

The control micon 19 determines at the step S5 whether an instruction for stopping the recording is given from the user. When the control micon 19 determines that no instruction for stopping the recording is given, the control micon 19 returns to the step S3 to repeat the processing from the step S3 onward. When the control micon 19 determines at the step S5 that an instruction for stopping the recording is given, the control micon 19 proceeds to a step S6, and controls the DVD signal processing unit 16 to store in the recording RAM 18 positional information of the DVD disk 2 and data less than 16 sectors of data, as described with reference to FIG. 3. The DVD signal processing unit 16 sets a flag (hereinafter referred to as a pause flag) in the recording RAM 18 for indicating that the recording is stopped.

Then, at a step S7, the DVD camcorder 1 is brought into a pause state.

At a step S8, the control micon 19 determines whether an instruction for rerecording is given from the user. When the control micon 19 determines that an instruction for rerecording is given, the control micon 19 resumes recording. Specifically, the DVD signal processing unit 16 reads the positional information and other data stored in the recording RAM 18 at a step S9, and then returns to the step S3 to resume recording at a position on the DVD disk 2 which position is specified by the positional information.

When the control micon 19 determines at the step S8 that no instruction for rerecording is given, on the other hand, the control micon 19 proceeds to a step S10 to determine whether an instruction for reproduction of data recorded on the DVD disk 2 is given. Incidentally, the reproduction also includes processing for fast-forwarding and fast-reversing the data recorded on the DVD disk 2 and the like.

When the control micon 19 determines at the step S10 that no instruction for reproduction of the data is given, the control micon 19 proceeds to a step S11 to determine whether a standby button is pressed. When recording is stopped, an internal state of the DVD camcorder 1 is a pause state. In order to change the pause state to a standby state (stop state), the user needs to press a recording stop button and further press the standby button.

Incidentally, for the user to change the state of the DVD camcorder 1 to the standby state, the user may be allowed to change the state of the DVD camcorder 1 to the standby state not only by operating the standby button but also by pressing the recording stop button twice in succession or the like.

When the control micon 19 determines at the step S11 that the standby button is not pressed, the control micon 19 returns to the step S7 to stand by in the pause state. When the control micon 19 determines that the standby button is pressed, the control micon 19 changes the internal state of the DVD camcorder 1 to the standby state, and then proceeds to a step S12.

At the step S12, the processing for ending the recording is performed. For example, under control of the control micon 19, as the processing for ending the recording, the DVD signal processing unit 16 continues recording until recording for one title is completed, and when recording for one title is completed, rewrites VTSI.

Further, as the processing for ending the recording, the DVD signal processing unit 16 performs so-called finalizing processing and the like to provide compatibility for allowing the data recorded on the DVD disk 2 to be reproduced by other reproducing apparatus.

At a step S13, the control micon 19 determines whether an instruction for ejecting the DVD disk 2 is given. When the control micon 19 determines that an instruction for ejecting the DVD disk 2 is given, the control micon 19 returns to the step S1 to repeat the processing from the step Si onward. Incidentally, in order to prevent the ejection of the DVD disk 2 before completion of the data writing processing, finalizing processing, and the like, the DVD camcorder 1 may be configured such that the ejection of the DVD disk 2 requires driving by power supply.

When the control micon 19 determines at the step S13 that no instruction for ejecting the DVD disk 2 is given, the control micon 19 proceeds to a step S14 to determine whether an instruction for turning power off is given.

When the control micon 19 determines at the step S14 that no instruction for turning power off is given, the control micon 19 returns to the step S2 to repeat the processing from the step S2 onward. When the control micon 19 determines at the step S14 that an instruction for turning power off is given, the control micon 19 stops power supply from a battery not shown to end the processing.

When the control micon 19 determines at the step S2 that no instruction for starting recording is given, on the other hand, the control micon 19 proceeds to a step S15.

The control micon 19 determines at the step S15 whether an instruction for reproduction (including reproduction, fast-forward, fast-reverse, and the like) of the data stored on the DVD disk 2 is given. When the control micon 19 determines that no instruction for reproduction of the data stored on the DVD disk 2 is given, the control micon 19 returns to the step S2 to repeat the processing from the step S2 onward.

When the control micon 19 determines at the step S15 that an instruction for reproduction of the data stored on the DVD disk 2 is given, and when the control micon 19 similarly determines at the step S10 that an instruction for reproduction of the data stored on the DVD disk 2 is given, the control micon 19 goes into reproduction mode at a step S16.

Then, at a step S17, the DVD signal processing unit 16 performs reproduction processing using the playback RAM 17. Specifically, the DVD signal processing unit 16 subjects a DVD reproduced stream supplied thereto from the analog front end 20 to processing such as demodulation, error correction, descrambling, and the like, and then outputs resulting data to the compression/expansion processing unit 14. The multiplexing separating unit 31 of the compression/expansion processing unit 14 separates the data supplied thereto into video data and audio data, and then outputs the video data to the video processing unit 32 and the audio data to the audio processing unit 33. The video processing unit 32 and the audio processing unit 33 each perform expansion processing, and then output expanded data to the video/audio encoder 13. The video/audio encoder 13 encodes the data supplied thereto, and then outputs the encoded data as an analog signal to a display unit and the like in a succeeding stage not shown in the figure.

At a step S18, the control micon 19 determines whether an instruction for ending the reproduction processing is given. Until the control micon 19 determines that an instruction for ending the reproduction processing is given, the control micon 19 returns to the step S16 and repeats the processing from the step S16 onward.

When the control micon 19 determines at the step S18 that an instruction for ending the reproduction processing is given, the control micon 19 proceeds to a step S19 to stop the reproduction processing and go into a pause state.

At a step S20, the DVD signal processing unit 16 under control of the control micon 19 determines whether a pause flag is set in the recording RAM 18. In a case where an instruction for stopping recording has been given and an instruction for reproduction has been given in the pause state, for example, a pause flag is set in the recording RAM 18.

When the DVD signal processing unit 16 determines that a pause flag is set in the recording RAM 18, the DVD signal processing unit 16 returns to the step S8 to repeat the processing from the step S8 onward. When the DVD signal processing unit 16 determines at the step S20 that no pause flag is set in the recording RAM 18, on the other hand, the DVD signal processing unit 16 returns to the step S13 to repeat the processing from the step S13 onward. Thereafter, when an instruction for turning power off is given, the processing is ended. Incidentally, when the DVD signal processing unit 16 determines at the step S20 that no pause flag is set in the recording RAM 18, the DVD camcorder 1 is brought into a standby state.

As described above, when an instruction for stopping recording is given, the DVD camcorder 1 stands by in the pause state. Therefore, even when an instruction for resuming recording is given immediately thereafter, the DVD camcorder 1 can perform corresponding processing immediately.

In addition, when an instruction for stopping recording is given, positional information of the DVD disk 2 is stored, and when an instruction for rerecording is given, recording is resumed at the next position on the DVD disk 2. Therefore, it is possible to prevent disk capacity from being wasted (it is possible to prevent a capacity corresponding to an amount from the time T2 to the time T4 in FIG. 1 from being wasted).

It is to be noted that while the recording RAM 18 stores positional information such as a track number, a sector number, and the like, data being recorded (data to which an error correction block cannot be added) and the like, the recording RAM 18 may store various other information. For example, a chapter number or the like may be set so that a track and sector where recording is to be resumed can be readily detected when an instruction for rerecording is given.

While in the example described above, the present invention is applied to a DVD camcorder, the present invention is applicable to any apparatus as long as the apparatus records additional data from a position continuously succeeding a recorded area. Of course, the present invention is applicable to DVD recording and reproducing apparatus that record and reproduce data in the video format.

The series of processing steps described above can be carried out not only by hardware but also by software. In this case, the DVD camcorder 1 is formed by a personal computer as shown in FIG. 6, for example.

Figure 6:
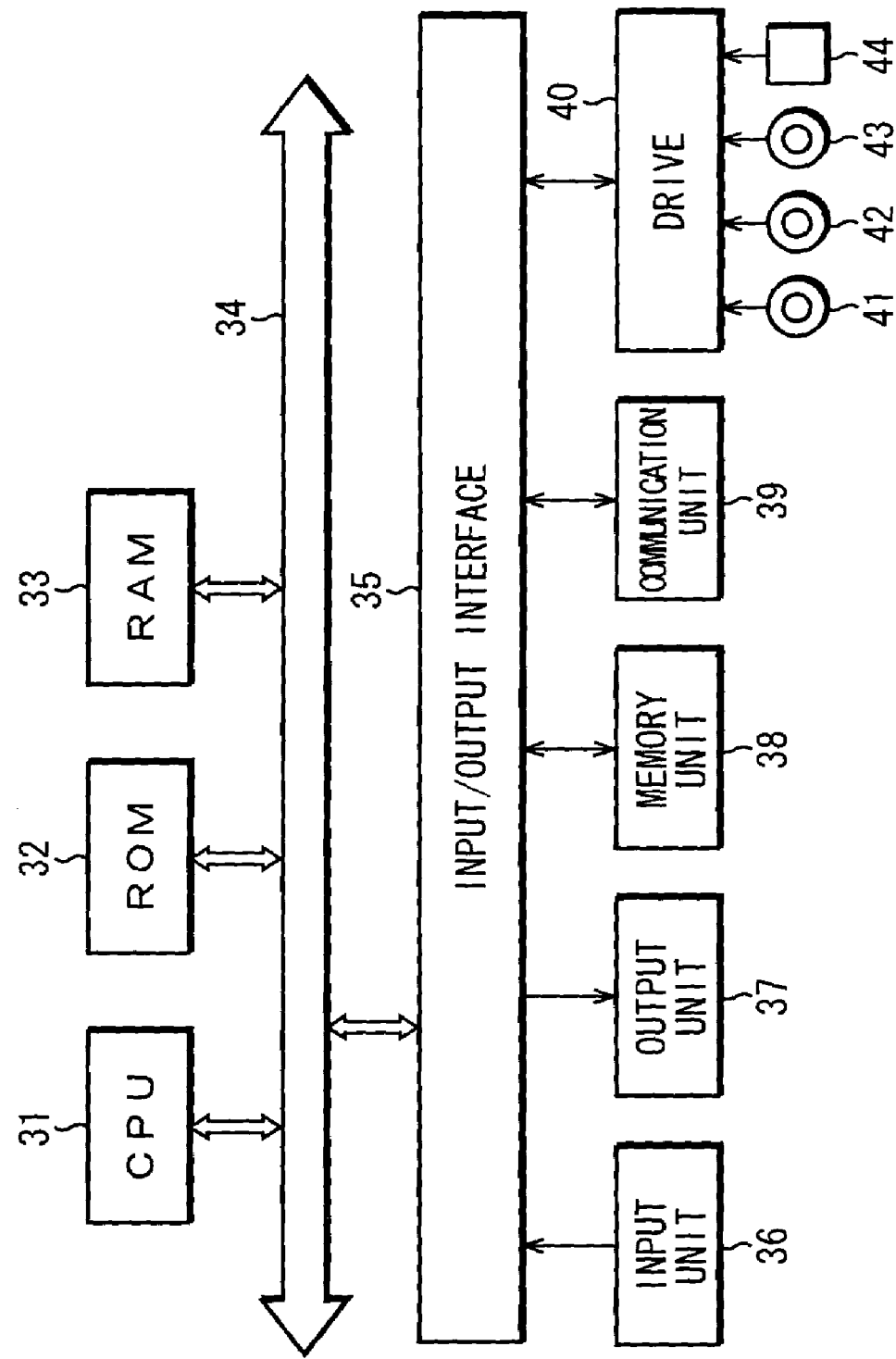
FIG. 6 is a block diagram showing an example of configuration of a personal computer.

A CPU (Central Processing Unit) 31 in FIG. 6 performs various processing according to programs stored in a ROM (Read Only Memory) 32 or programs loaded from a memory unit 38 into a RAM (Random Access Memory) 33. The RAM 33 also stores data and the like necessary for the CPU 31 to perform various processing, as required.

The CPU 31, the ROM 32, and the RAM 33 are connected to each other via a bus 34. The bus 34 is also connected with an input/output interface 35.

The input/output interface 35 is connected with an input unit 36 formed by a keyboard, a mouse, and the like, an output unit 37 including a display formed by a CRT (Cathode Ray Tube), an LCD (Liquid Crystal Display), or the like, a speaker, and the like, the memory unit 38 formed by a hard disk or the like, and a communication unit 39 formed by a modem, a terminal adapter, or the like. The communication unit 39 performs communication processing via a network.

When necessary, the input/output interface 35 is also connected with a drive 40, into which a magnetic disk 41, an optical disk 42, a magneto-optical disk 43, a semiconductor memory 44, or the like is inserted as required. A computer program read from the magnetic disk 41, the optical disk 42, the magneto-optical disk 43, the semiconductor memory 44, or the like is installed in the memory unit 38 as required.

When the series of processing steps is to be carried out by software, a program forming the software is installed from a network or a recording medium onto a computer that is incorporated in special hardware, or for example a general-purpose personal computer or the like that can perform various functions by installing various programs thereon.

As shown in FIG. 6, the recording medium is not only formed by packaged media, which is formed by the magnetic disk 41 (including a floppy disk), the optical disk 42 (including CD-ROM (Compact Disk-Read Only Memory) and DVD (Digital Versatile Disk)), the magneto-optical disk 43 (including MD (Mini-Disc)), the semiconductor memory 44, or the like having the program recorded thereon to distributed to users to provide the program separately from the apparatus proper, but also formed by the ROM 32, the hard disk included in the memory unit 38 or the like which has the program recorded thereon and is provided to the user in a state of being preincorporated in the apparatus proper.

It is to be noted that in the present specification, the steps describing the program recorded on the recording medium include not only processing carried out in time series in the described order but also processing carried out in parallel or individually and not necessarily in time series.

INDUSTRIAL APPLICABILITY

As described above, according to the present invention, with the recording apparatus and method and the program of the present invention, data is recorded from a position continuously succeeding a recorded area on an optical disk, and a pause state is set in response to an instruction for stopping the recording. When the pause state is set, stop position information of the optical disk is stored, and when an instruction for starting recording is given in the pause state, the stored stop position information is read. Then, recording is started at a position on the optical disk which position corresponds to the read stop position information. Therefore, recording can be resumed immediately after the recording is stopped. It is thus possible to improve operability and prevent disk capacity from being wasted.

The invention claimed is:

1. A recording apparatus comprising:
   recording means for recording data from a position continuously succeeding a recorded area on an optical disk;
   first setting means for setting a pause state in response to a user's instruction for stopping the recording of said recording means;
   storing means for storing stop position information of said optical disk when the pause state is set by said first setting means;
   reading means for reading said stop position information stored by said storing means when an instruction for starting recording by said recording means is given in the pause state;
   record-ending process means for performing processing for ending the recording by said recording means when the user's instruction for setting a stop state is given during the pause state;
   reproducing means for reproducing said data recorded by said recording means;
   determining means for determining whether reproduction made thus far has been started after cancellation of a pause state when the user's instruction for stopping the reproduction by said reproducing means is given; and
   second setting means for setting a pause state when said determining means determines that the reproduction has been started after the cancellation of the pause state, wherein, in response to a user's instruction, said recording means resumes recording at a position on said optical disk which position corresponds to said stop position information read by said reading means; and wherein said processing for ending the recording operation of said recording means always requires the two steps of setting the pause state of the recording means then performing the ending-operation during the pause state.

2. A recording apparatus as claimed in claim 1, wherein:

said storing means further stores said data already obtained in a case where a predetermined unit of said data to which to add an error correction block is not obtained when the user's instruction for stopping the recording by said recording means is given; and said recording means starts recording on the basis of said data already obtained and stored by said storing means when the instruction for starting the recording is given in the pause state.

3. A recording apparatus as claimed in claim 1, further comprising prohibiting means for prohibiting ejection of said optical disk while said recording means records said data.

4. A recording method comprising the steps of:

recording data from a position continuously succeeding a recorded area on an optical disk;

setting a pause state in response to a user's instruction for stopping the recording;

storing stop position information of said optical disk when the pause state is set;

reading said stored stop position information when an instruction for starting recording is given in the pause state;

ending the recording operation when a user's instruction for setting a stop state is given in the pause state;

reproducing said data recorded by said recording means;

determining whether reproduction made thus far has been started after cancellation of a pause state when the user's instruction for stopping the reproduction by said reproducing means is given; and setting a pause state when said determining means determines that the reproduction has been started after the cancellation of the pause state, wherein, in response to a user's instruction, recording processing resumes recording at a position on said optical disk which position corresponds to said read stop position information; and wherein said processing for ending the recording operation of said recording means always requires the two steps of setting the pause state of the recording means then performing the ending-operation during the pause state.

5. A computer readable storage medium having a program thereon for a recording apparatus capable of recording data on an optical disk, said program causing said recording apparatus to execute the steps of:

recording data from a position continuously succeeding a recorded area on an optical disk;

setting a pause state in response to a user's instruction for stopping the recording;

storing stop position information of said optical disk when the pause state is set;

reading said stored stop position information when an instruction for starting recording is given in the pause state;

ending the recording operation when a user's instruction for setting a stop state is given in the pause state;

reproducing said data recorded;

determining whether reproduction made thus far has been started after cancellation of the pause state when the user's instruction for stopping reproduction is given; and setting a pause state when it is determined that reproduction has been started after the cancellation of the pause state, wherein, in response to a user's instruction, the recording processing resumes recording at a position on said optical disk which position corresponds to said read stop position information; and wherein said processing for ending the recording operation of said recording means always requires the two steps of setting the pause state of the recording means then performing the ending-operation during the pause state.

6. Recording apparatus comprising:

a recording unit configured to record data from a position continuously succeeding a recorded area on an optical disk;

a first setting unit configured to set a pause state in response to a user's instruction for stopping the recording by said recording unit;

a storing unit configured to store stop position information of said optical disk when the pause state is set by said setting unit;

a reading unit configured to read said stop position information stored by said storing unit when an instruction for starting recording by said recording unit is given in the pause state;

a record-ending process unit configured to perform processing for ending the recording by said recording unit when a user's instruction for setting a stop state is given in the pause state;

a reproducing unit configured to reproduce said data recorded;

a determining unit configured to determine whether reproduction made thus far has been started after cancellation of the pause state when the user's instruction for stopping reproduction is given; and a second setting unit configured to set a pause state when it is determined that reproduction has been started after the cancellation of the pause state, wherein, in response to a user's instruction, said recording unit resumes recording at a position on said optical disk which position corresponds to said stop position information read by said reading unit; and wherein said processing for ending the recording operation of said recording means always requires the two steps of setting the pause state of the recording means then performing the ending-operation during the pause state.

* * * * *